United States Patent
Paran et al.

(10) Patent No.: US 11,494,746 B1
(45) Date of Patent: *Nov. 8, 2022

(54) MACHINE LEARNING SYSTEM, METHOD, AND COMPUTER PROGRAM FOR MAKING PAYMENT RELATED CUSTOMER PREDICTIONS USING REMOTELY SOURCED DATA

(71) Applicant: Amdocs Development Limited, Limassol (CY)

(72) Inventors: Eran Yosef Paran, Hod Hasharon (IL); Liat Taub Bahar, Kfar Sabba (IL); Shmuel Ur, Shorashim (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 202 days.

This patent is subject to a terminal disclaimer.

(21) Appl. No.: 16/935,050

(22) Filed: Jul. 21, 2020

(51) Int. Cl.
*G06Q 20/00* (2012.01)
*G06Q 20/10* (2012.01)
*H04M 15/00* (2006.01)
*G06N 20/00* (2019.01)
*G06F 16/955* (2019.01)

(52) U.S. Cl.
CPC ......... *G06Q 20/102* (2013.01); *G06F 16/955* (2019.01); *G06N 20/00* (2019.01); *H04M 15/41* (2013.01)

(58) Field of Classification Search
CPC .... G06Q 20/102; G06F 16/955; G06N 20/00; H04M 15/41
See application file for complete search history.

(56) References Cited

U.S. PATENT DOCUMENTS

| 6,798,876 | B1 | 9/2004 | Bala |
| 9,635,181 | B1 | 4/2017 | McGann et al. |
| 10,635,987 | B1 | 4/2020 | Chen et al. |
| 2008/0010215 | A1* | 1/2008 | Rackley, III ......... G06Q 20/326 705/70 |
| 2009/0024546 | A1 | 1/2009 | Ficcaglia et al. |

(Continued)

OTHER PUBLICATIONS

Paran et al., U.S. Appl. No. 16/935,068, filed Jul. 21, 2020.

(Continued)

*Primary Examiner* — Khai M Nguyen
(74) *Attorney, Agent, or Firm* — Zilka-Kotab, P.C.

(57) ABSTRACT

As described herein, a machine learning system, method, and computer program are provided for making payment related customer predictions using remotely sourced data. A system of a communication service provider (CSP) identifies a customer of the CSP. Additionally, the system collects data from a plurality of data sources independent from the CSP, the data including telephone numbers and/or webpage URLs of other services providers that are associated with making payments. Further, the system processes the collected data to form input data indicating which of the telephone numbers were contacted by the customer and/or webpage URLs were accessed by the customer. Still yet, the system processes the input data using at least one machine learning algorithm to make at least one payment related prediction for the customer. Moreover, the system outputs the at least one payment related prediction made for the customer.

20 Claims, 5 Drawing Sheets

(56) References Cited

U.S. PATENT DOCUMENTS

| | | | |
|---|---|---|---|
| 2009/0222313 A1* | 9/2009 | Kannan | G06Q 30/0202 707/999.005 |
| 2010/0332287 A1 | 12/2010 | Gates et al. | |
| 2012/0246043 A1* | 9/2012 | Leskuski | H04M 15/745 705/34 |
| 2012/0284080 A1* | 11/2012 | De Oliveira | G06Q 30/0201 705/7.29 |
| 2012/0289188 A1* | 11/2012 | Marcus | H04M 15/858 455/406 |
| 2015/0310336 A1 | 10/2015 | Sotela et al. | |
| 2016/0110422 A1 | 4/2016 | Roytman et al. | |
| 2016/0253688 A1 | 9/2016 | Nielsen et al. | |
| 2019/0266622 A1 | 8/2019 | Turnbull et al. | |
| 2020/0120003 A1 | 4/2020 | Sridhar et al. | |

OTHER PUBLICATIONS

Choi, C., "Predicting Customer Complaints in Mobile Telecom Industry Using Machine Learning Algorithms," ProQuest, Purdue University Thesis, May 2018, 77 pages.

Praxidia, "Complaints Prediction," Praxidia, 2020, 2 pages, retrieved from https://www.praxidia.com/our-services-en/complaints-prediction-en/.

Xu et al., "A Comparative Study of Customer Complaint Prediction Model of Time Series, Multiple Linear Regression and BP Neural Network," Journal of Physics: Conference Series, vol. 1187, 2019, pp. 1-7.

Hadden et al., "Churn Prediction using Complaints Data," World Academy of Science, Engineering and Technology, vol. 19, 2008, pp. 809-814.

Richter, D., "Predict Customer Churn with Machine Learning," Medium, Feb. 5, 2019, 11 pages, retrieved from https://medium.com/into-advanced-procurement/predict-customer-churn-with-machine-learning-c3fdb58ba4e3#:~:text=If%20businesses%20can%20effectively%20predict,rate%20and%20maximize%20their%20revenue.

Mudano, "Predictive complaints analysis," Mudano Analytics Case Studies, 2019, 1 page, retrieved from https://mudano.com/wp-content/uploads/2019/07/Mudano-Analytics-Case-Studies_predictive-complaints-analysis.pdf.

Galetto, M., "What is Next Best Offer?" NG Data, Jan. 5, 2017, 8 pages, retrieved from https://www.ngdata.com/what-is-next-best-offer/.

Non-Final Office Action from U.S. Appl. No. 16/935,068, dated Mar. 25, 2022.

* cited by examiner

MACHINE LEARNING SYSTEM, METHOD, AND COMPUTER PROGRAM FOR MAKING PAYMENT RELATED CUSTOMER PREDICTIONS USING REMOTELY SOURCED DATA

FIELD OF THE INVENTION

The present invention relates to making predictions about customers.

BACKGROUND

Business entities have traditionally made predictions regarding customers for many purposes, such as improving a product or service provided to the customer. In some scenarios, customer complaints and/or customer churn have been predicted for taking proactive action to avoid the complaints and/or churn. However, since current customer prediction techniques are limited in the source data utilized to make such predictions, the type of predictions that can be made is limited. For example, business entities may be able to predict customer complaints or churn using their own activity data, but may not be able to make payment related predictions, or at least accurate payment related predictions, that are based on customer activity with other business entities.

There is thus a need for addressing these and/or other issues associated with the prior art.

SUMMARY

As described herein, a machine learning system, method, and computer program are provided for making payment related customer predictions using remotely sourced data. A system of a communication service provider (CSP) identifies a customer of the CSP. Additionally, the system collects data from a plurality of data sources independent from the CSP. The data includes, at least in part, telephone numbers of one or more other providers that are associated with making payments, or webpage uniform resource locators (URLs) of one or more other providers that are associated with making payments. Further, the system processes the collected data to form input data. The processing includes matching at least one of the telephone numbers of the one or more other providers to call detail records (CDRs) stored for the customer by the CSP such that the input data indicates, at least in part, one or more of the telephone numbers that were contacted by the customer (e.g. via call or short message service (SMS)), or the webpage URLs of the one or more other providers to Internet browsing events associated with the customer and stored by the CSP such that the input data indicates, at least in part, one or more of the webpage URLs that were accessed by the customer. Still yet, the system processes the input data using at least one machine learning algorithm to make at least one payment related prediction for the customer. Moreover, the system outputs the at least one payment related prediction made for the customer.

DETAILED DESCRIPTION

Figure 1:
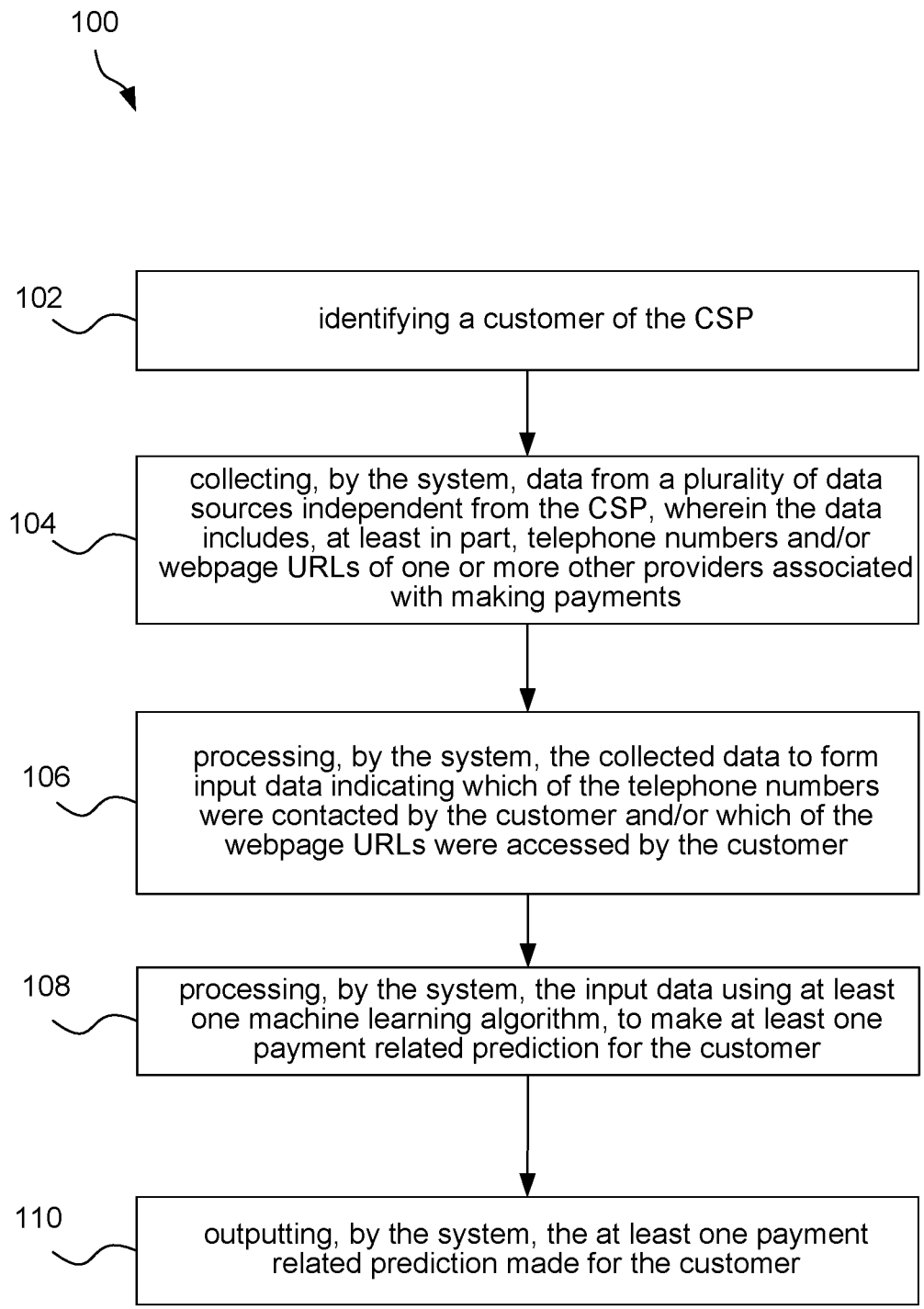
FIG. 1 illustrates a method for making a payment related customer prediction using remotely sourced data, in accordance with one embodiment.

FIG. 1 illustrates a method 100 for making a payment related customer prediction using remotely sourced data, in accordance with one embodiment. The method 100 may be performed by a system (e.g. server, etc.) of a CSP. The system may thus have access to information stored for the customer by the CSP, such as account information, demographic information, call detail records (CDRs) associated with the customer, billing information, etc.

In operation 102, a customer of the CSP is identified. The CSP is an entity, formed as a system architecture, which provides services to users. For example, the services of the CSP may be communication services, such as an Internet service, a telephone service, and/or may be media, television and/or streaming services as well. The customer may be any user of one or more services of the CSP. In one embodiment, the customer may have an account with the CSP (i.e. may be subscriber to the one or more services of the CSP).

Additionally, in operation 104, data is collected from a plurality of data sources independent from the CSP, where the data includes, at least in part, telephone numbers and/or webpage URLs of one or more other providers (e.g. product and/or service providers) that are associated with making payments. In particular, the data sources may be provided by business entities other than the CSP. In various embodiments, the data sources may be webpages, telephone directories, social media platforms, etc.

In one embodiment, the payments may relate to purchases. In this case, the telephone numbers of the other provider(s) may include customer sales phone numbers and/or telephone numbers of delivery (e.g. shipping) service providers. As another option, the webpage URLs of the other provider(s) may include URLs of sales webpages (e.g. webpages for making purchases) and/or delivery tracking webpages.

In another embodiment, the payments may relate to bill payments (i.e. payments made on invoices for products and/or services of the other provider(s). In this case, the telephone numbers of the other provider(s) may include payment related phone numbers (e.g. phone numbers called to make bill payments). As another option, the webpage URLs of the other provider(s) may include URLs of payment related webpages (e.g. webpages for making bill payments).

Further, in operation 106, the collected data is processed to form input data indicating one or more of the telephone numbers that were called by the customer and/or one or more of the webpage URLs that were accessed by the customer. In particular, the processing includes matching the telephone numbers to call detail records (CDRs) stored for the customer by the CSP (i.e. in which case the input data indicates, at least in part, one or more of the telephone numbers that were contacted by the customer, either by call or SMS), and/or includes matching the webpage URLs to Internet browsing events associated with the customer and stored by the CSP (i.e. such that the input data indicates, at least in part, one or more of the webpage URLs that were accessed by the customer).

With respect to the processing involving matching the telephone numbers to the CDRs stored for the customer, the processing may include (1) accessing, in storage of the CSP, the CDRs associated with the customer, (2) matching one or more of the CDRs to one or more of the telephone numbers, and (3) storing, as the input data, each of the one or more CDRs as indicating a potential payment made by the customer. With respect to the processing involving matching the webpage URLs to the Internet browsing events associated with the customer, the processing may include (1) accessing, in storage of the CSP, the Internet browsing events associated with the customer, (2) matching one or more of the Internet browsing events to one or more of the webpage URLs, and (3) storing, as the input data, each of the one or more Internet browsing events as indicating a potential payment made by the customer.

In additional possible embodiments, the input data may include (e.g. may be modified to include) billing information stored by the CSP for the customer. For example, the billing information may indicate purchases made by the customer in association with one or more other providers and billed to the customer by the CSP through direct carrier billing. As another example, the billing information may indicate purchases made by the customer for products or services of the CSP.

Still yet, in operation 108, the input data is processed using at least one machine learning algorithm to make at least one payment related prediction for the customer. In one embodiment, the payment related prediction may be a prediction of a time period when the customer will make a payment. The payment may be a payment on a bill and/or a purchase of a new product or service.

Moreover, in operation 110, the at least one payment related prediction made for the customer is output. The payment related prediction(s) may be output for determining (e.g. selecting) a time to take one or more actions selected based on policies, rules, etc. The time that is determined for taking the action(s) may be within the time period in which it is predicted the customer will make a payment.

For example, the payment related prediction(s), such as a prediction of when the customer will pay a bill, may be output for determining a time to request from the customer payment on a bill. The request may then be sent to the customer at the determined time. As another example, the payment related prediction(s), such as a prediction of when the customer will make a purchase, may be output for determining a time to offer a new product or service to the customer for purchase. The offer may then be sent to the customer at the determined time. In yet another embodiment, the payment related prediction(s) may be output for determining a time when the customer usually makes payments. This may be useful even if the customer is not being charged. For example, if the customer is expected to pay for something he bought before, and this time passed and he did not make the payment, then a responsive action may be taken.

To this end, a machine learning algorithm traditionally employed by a CSP to make customer predictions may be improved by matching the remotely sourced data, including provider telephone numbers and/or URLs, to customer data stored by the CSP, including CDRs and/or Internet browsing events. Use of the remotely sourced data in this manner may make the predictions of the machine learning algorithm more accurate (i.e. more likely to be correct).

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
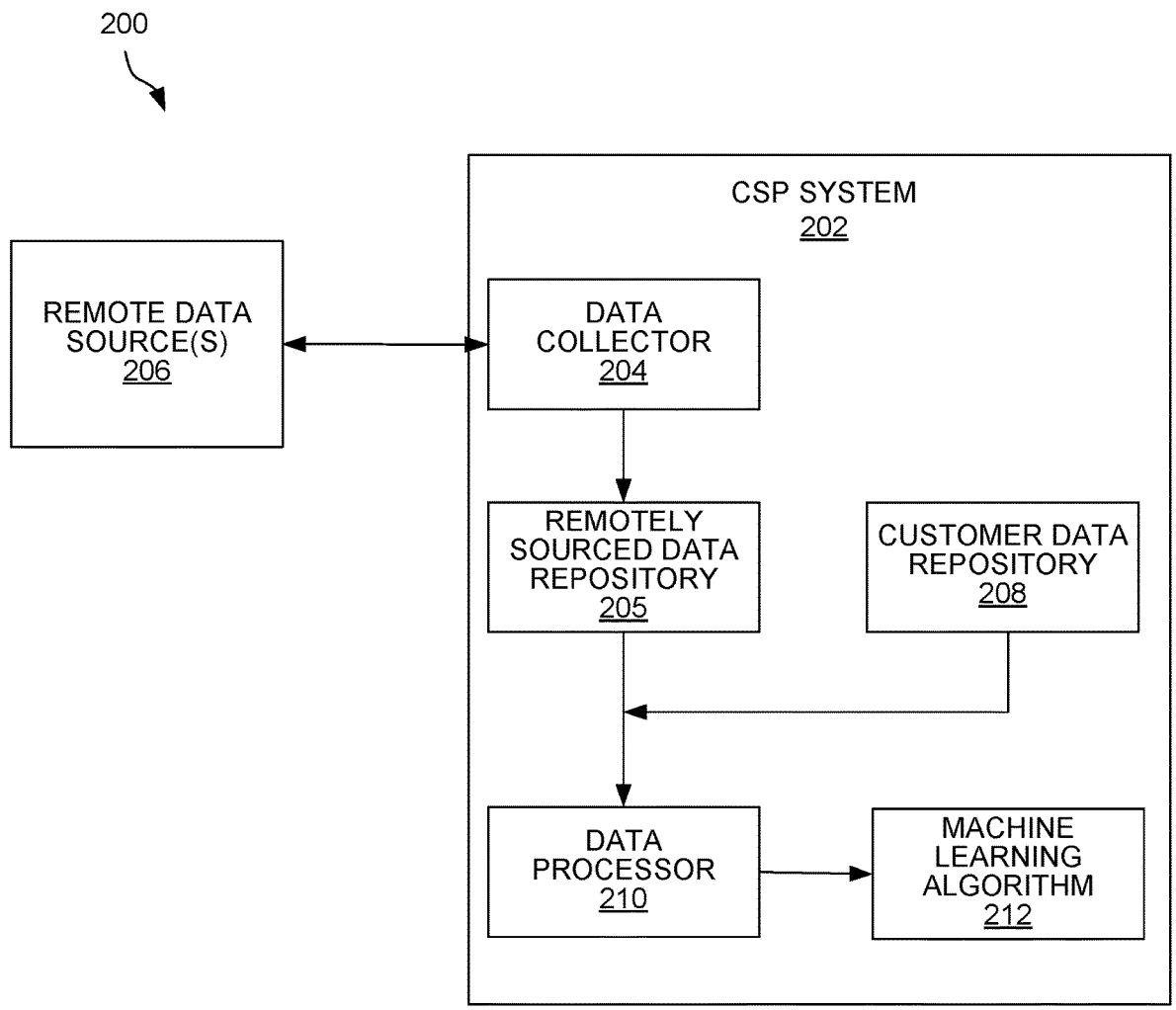
FIG. 2 illustrates a system for making a payment related customer prediction using remotely sourced data, in accordance with one embodiment.

FIG. 2 illustrates a system 200 for making a payment related customer prediction using remotely sourced data, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes a CSP system (i.e. subsystem) 202 and one or more remote data sources 206. The CSP system 202 communicates with the remote data source(s) 206 via one or more networks, such as the Internet. The CSP system 202 collects data from the remote data source(s) 206 for use in making a payment related prediction associated with a customer, as described below.

The CSP system 202 includes a data collector module (e.g. program, process, etc.) 204 that collects the data from the remote data source(s) 206. Such data may be referred to herein as "remotely sourced data." The data collector module 204 may collect the data by querying databases of the remote data source(s) 206, scraping the remote data source(s) 206, or in any other manner. The remotely sourced data includes, at least in part, telephone numbers and/or webpage URLs of one or more other providers that are associated with making payments. To this end, the remotely sourced data may be associated with customer payments.

The data collector module 204 stores the remotely sourced data in a remotely sourced data repository 205 of the CSP system 202. As also shown, the CSP system 202 includes a customer data repository 208. The customer data repository 208 stores data associated with customers of the CSP, such as account information, demographics information, and/or service usage information (e.g. CDRs, Internet browsing events, etc.). The customer data repository 208 may store customer data that is proprietary to the CSP (i.e. generated by the CSP in association with providing one or more services to its customers).

The CSP system 202 also includes a data processor 210 which retrieves data from the remotely sourced data repository 205 for processing to form input data that is input to a machine learning algorithm 212. In one embodiment, the processing includes matching the telephone numbers of the one or more other providers to CDRs stored for the customer in the customer data repository 208 such that the input data indicates, at least in part, one or more of the telephone numbers that were contacted by the customer. In another embodiment, the processing includes matching the webpage URLs of the one or more other providers to Internet browsing events stored for the customer in the customer data repository 208 such that the input data indicates, at least in part, one or more of the webpage URLs that were accessed by the customer.

The machine learning algorithm 212 processes the input data to make one or more payment related predictions for a customer, and the prediction(s) is then output by the CSP system 202. Of course, while only one machine learning algorithm 212 is shown, another embodiment is contemplated in which the CSP system 202 includes multiple machine learning algorithms each for making different types of payment related predictions for customers (e.g. prediction for making a bill payment prediction for making a purchase, etc.).

To this end, the data processor 210 may query the remotely sourced data repository 205 for data that is associated with customer data stored in the customer data repository 208 for a particular customer. For example, the data processor 210 may retrieve customer data stored in the customer data repository 208 for a particular customer and then use that data to query the remotely sourced data repository 205. This may allow the data processor 210 to correlate data between the remotely sourced data repository 205 and the customer data repository 208 to form input data (e.g. indicating potential payments made by the customer to at least one other provider).

Figure 3:
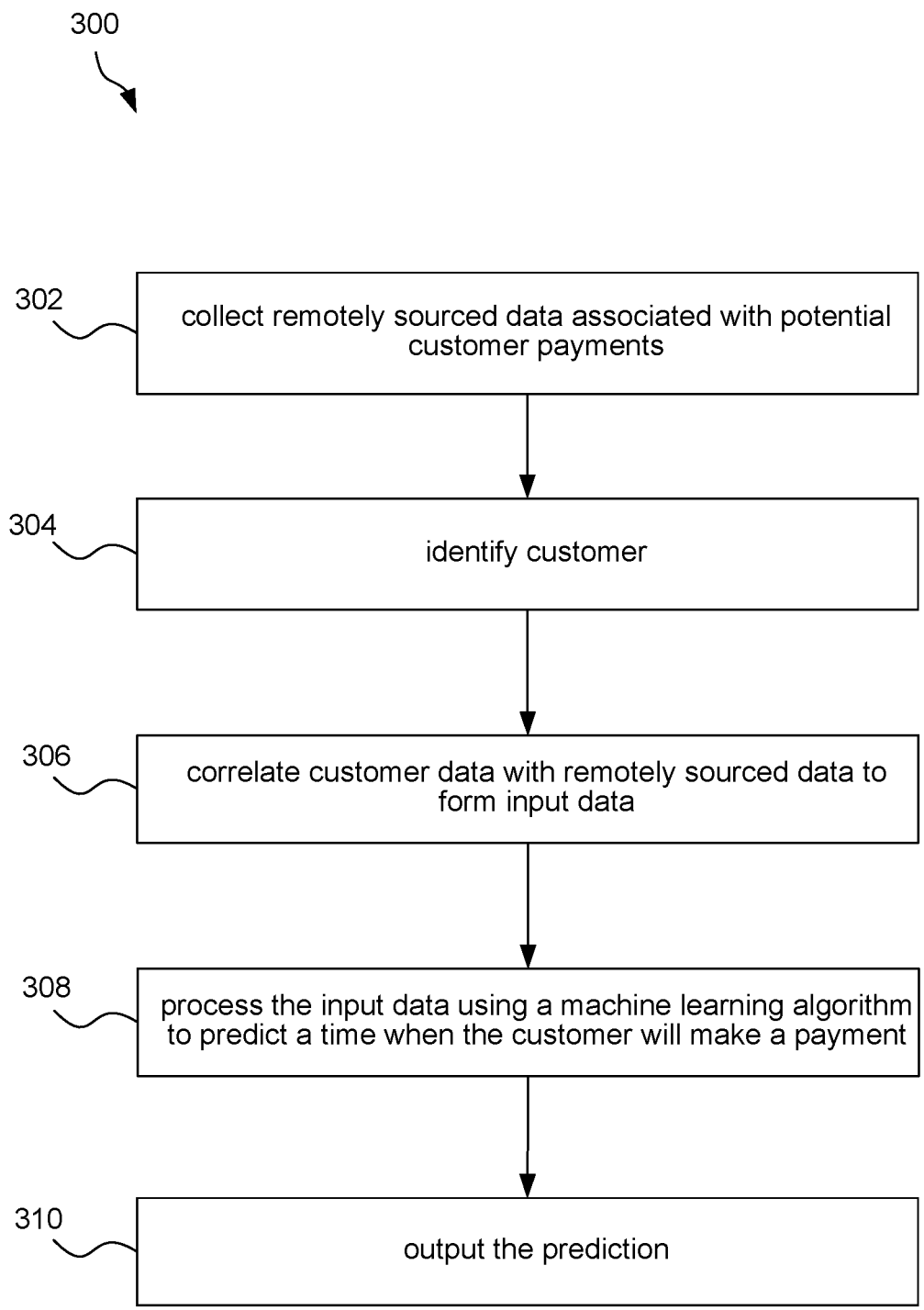
FIG. 3 illustrates a method for making a prediction of a time when a customer of a CSP will make a payment, in accordance with one embodiment.

FIG. 3 illustrates a method 300 for making a prediction of a time when a customer of a CSP will make a payment, in accordance with one embodiment. As an option, the method 300 may be carried out in the context of the details of the system 200 of FIG. 2. Of course, however, the method 300 may be carried out in the context of any desired environment. Further, the aforementioned definitions may equally apply to the description below.

As shown in operation 302, remotely sourced data associated with potential customer payments is collected. The remotely sourced data may include telephone numbers of other providers that are associated with making payments and/or webpage URLs of other providers that are associated with making payments. For example, a list of all phone numbers that are dedicated to payments may be collected. These phone numbers may be associated with various other product or providers, such as telecom providers, utility, air lines, restaurants, insurance, etc. As an option, a database of known providers with their public payment (e.g. billing or purchasing) related phone numbers may be stored. This information may be scraped from Internet websites (e.g. telephone directories such as the Yellow Pages®) and other public data sources.

In another embodiment, the remotely sourced data may include webpage URLs of other providers that are associated with making payments. For example, a list of URLs for use in making payments to providers may be collected and stored, similarly to the phone numbers described above.

Additionally, in operation 304, a customer is identified. The customer may be any customer of the CSP for which a payment related prediction is to be made. For example, the customer may be selected from a database of customers stored by the CSP.

Further, in operation 306, customer data is correlated with the remotely sourced data to form input data. In the present embodiment, the input data indicates potential payments made by the customer to at least one other provider. Also, with respect to the present embodiment, the customer data is any data stored for the customer by the CSP.

For example, the customer data may include phone numbers the customer has contacted. This information may be collected from the customer's CDRs, which include phone call metadata that details each of the phone numbers the customer has contacted, when the contact was made, whether the contact was successful, the contact duration, basic location information from where the user contacted the phone numbers, or any other data except for an actual content of the contact. In this case, the phone numbers the customer has contacted (e.g. within a defined time period) may be correlated to the list of payment related phone numbers described above, and the correlated contacts may be marked (in input data) as potential payments made by the customer to at least one other provider. The input data may also indicate a type of provider to which the contact was made.

As another example, the customer data may include URLs accessed by the customer. This information may be collected from the browsing logs stored for the customer by the CSP, or using cookies stored by the customer's Internet browser. In this case, the URLs the customer has visited (e.g. within a defined time period) may be correlated to the list of payment related URLs described above, and the correlated URLs may be marked (in input data) as potential payments made by the customer to at least one other provider.

In summary, operation 306 may operate to create a log of potential payments made by the customer. For each potential payment, the input data may include the information shown in Table 1.

Table 1

Time the payment was made
Duration of conversation for the payment
The media used to make the payment (e.g. phone, URL, social media platform, etc.)
Payment frequency (e.g. repetition of the payment)
Provider category (e.g. communication, content, utility, food, entertainment, etc.)

Still yet, in operation 308, the input data is processed using a machine learning algorithm to predict a time period when the customer will make a payment. In one embodiment, the machine learning algorithm may also take other input data, such as customer data stored by the CSP. This customer data may include billing information stored by the CSP for the customer (e.g. purchases made by the customer and billed to the customer by the CSP through direct carrier billing, purchases made by the customer for products or services of the CSP, etc.), demographics, device information, information describing prior interactions of the customer with the CSP, etc.). By using the remotely sourced data, with the call/SMS and/or webpage data, to form the input data, as in the manner described above, the machine learning algorithm may more accurately predict when a customer will make a payment, as opposed to other embodiments where the machine learning algorithm only processes more limited data of the CSP to make the customer payment prediction.

In operation 310, the prediction is output. In one embodiment, the prediction is output for use in determining one or more actions to take and a time to take the one or more actions. Exemplary actions include requesting a bill payment from the customer, providing an offer to the customer to purchase a product or service, among other actions related to payment being made by the customer. The CSP may then take the determined action(s). In another embodiment, the prediction may be output for use in determining whether the customer is having financial problems (i.e. lack of funds), particularly in the situation where the customer has not paid a bill issued by the CSP. The CSP may also take some desired action when the customer is determined to be having financial problems (e.g. offer a payment plan).

To this end, the method 300 may provide a prediction of when a customer is willing to make a payment. This information may be useful when trying to sell products or services to the customer, and/or it may be useful when trying to collect money owed (i.e. billed). In any case, customers may prefer making payments on some dates over others. These dates may be constant from month to month (e.g. depending on the date that they have income coming in from their employment) or may be irregular.

For example, the prediction may indicate that the customer pays on the same schedule from month to month (e.g.

the 4th of every month), and/or can indicate that the customer is likely to pay at the current moment in time (e.g. irregular payments). As a result, the prediction may be used to identify when the customer is more likely to pay, and when the customer is less likely to pay, which can be the basis for taking payment related action in association with the customer.

Figure 4:
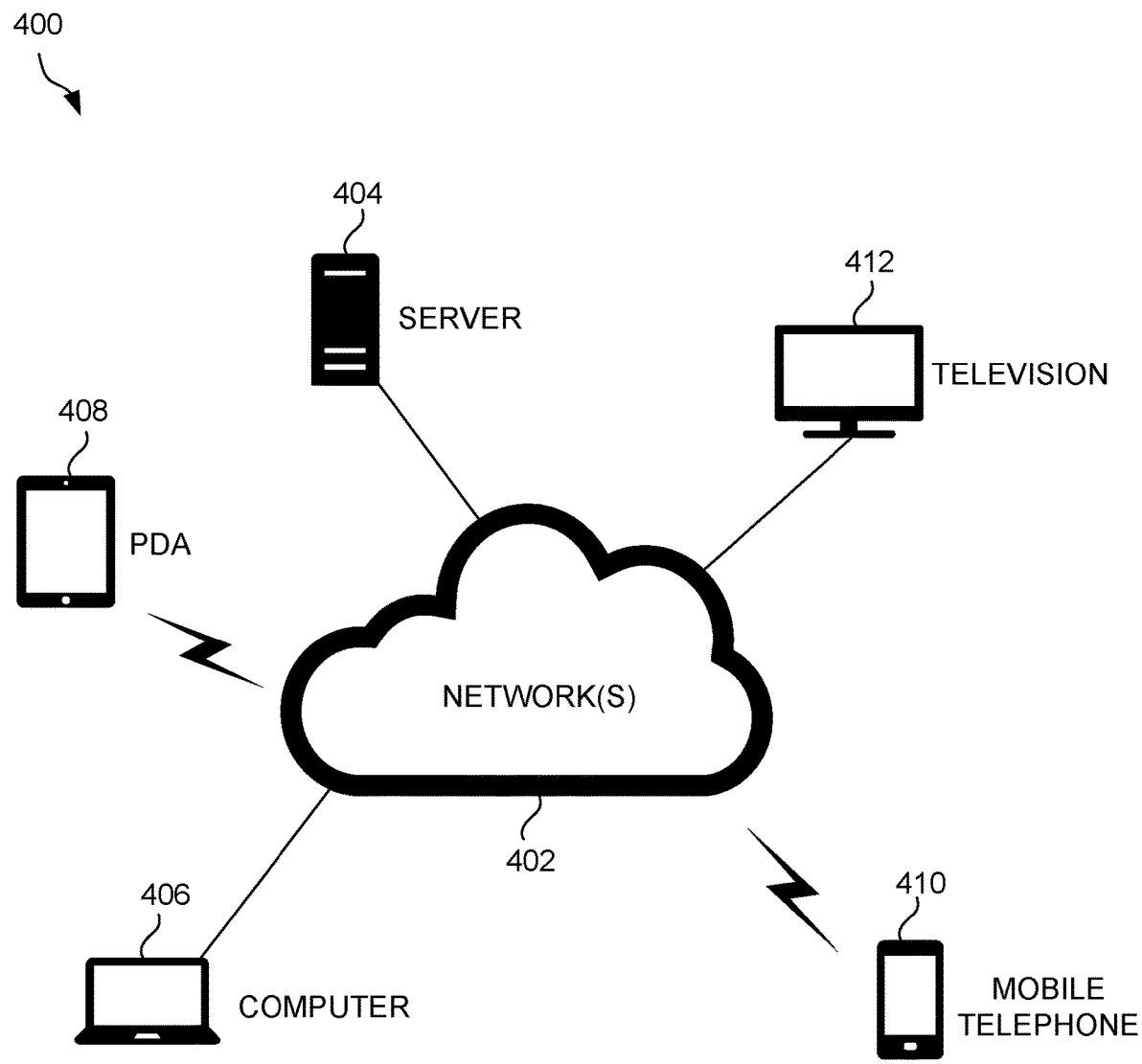
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
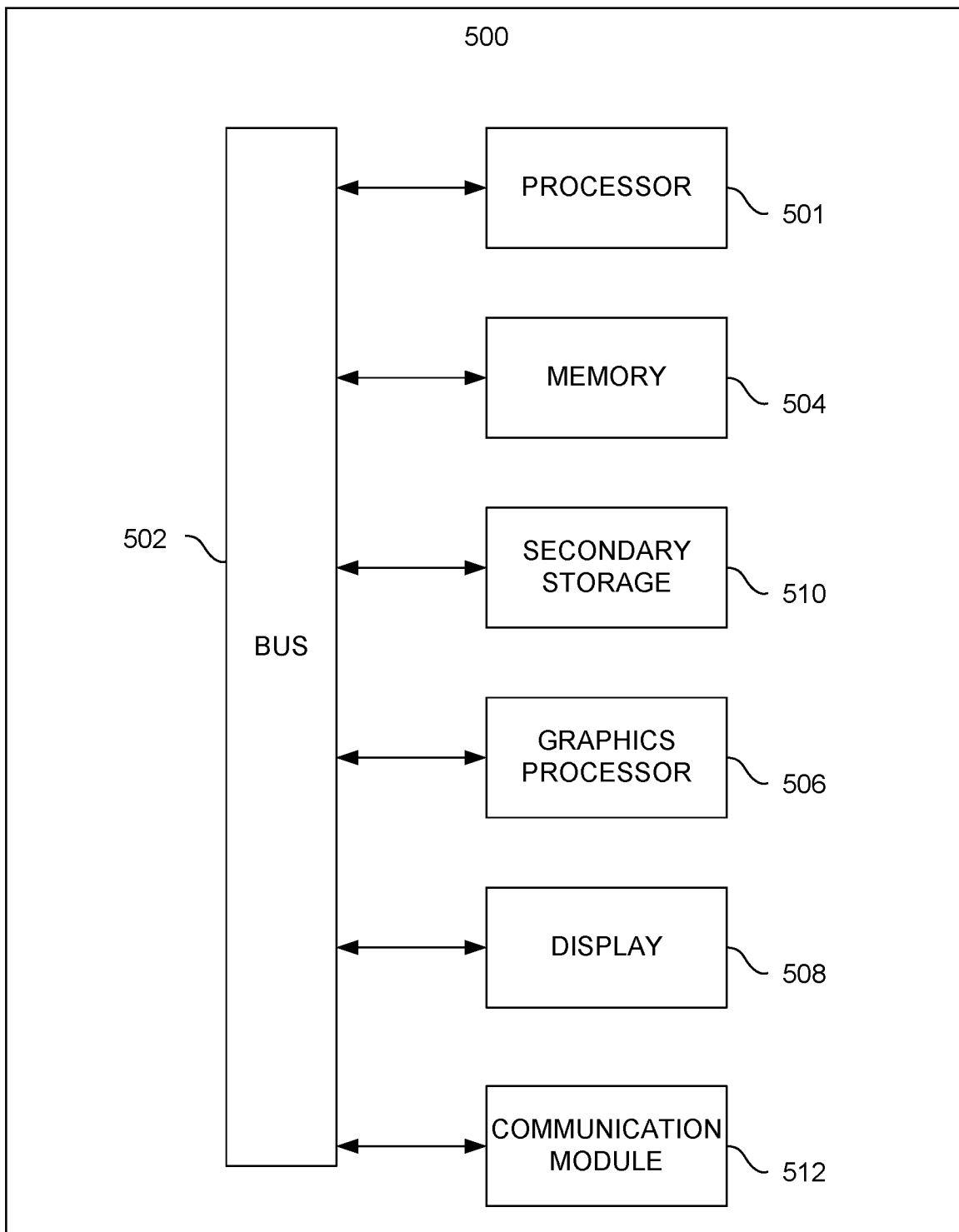
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of non-transitory computer-readable media.

The system 500 may also include one or more communication modules 512. The communication module 512 may be operable to facilitate communication between the system 500 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium storing computer code executable by a processor to perform a method comprising:
    identifying, by a system of a communication service provider (CSP), a customer of the CSP;
    collecting, by the system, data from a plurality of data sources independent from the CSP, wherein the data includes, at least in part, one of:
        telephone numbers of one or more other providers that are associated with making payments, or
        webpage uniform resource locators (URLs) of one or more other providers that are associated with making payments;
    processing, by the system, the collected data to form input data, the processing including matching at least one of:
        the telephone numbers of the one or more other providers to call detail records (CDRs) stored for the customer by the CSP such that the input data indicates, at least in part, one or more of the telephone numbers of the one or more other providers that were previously called by the customer, or
        the webpage URLs of the one or more other providers to Internet browsing events associated with the customer and stored by the CSP such that the input data indicates, at least in part, one or more of the webpage URLs of the one or more other providers that were previously accessed by the customer;
    processing, by the system, the input data using at least one machine learning algorithm, to make at least one payment related prediction for the customer that is based on the one or more other providers having a payment related phone number previously called by the customer or the one or more other providers having a payment related webpage previously accessed by the customer; and
    outputting, by the system, the at least one payment related prediction made for the customer.

2. The non-transitory computer readable medium of claim 1, wherein the input data indicates potential purchases made by the customer with respect to at least one other provider.

3. The non-transitory computer readable medium of claim 2, wherein the telephone numbers of the one or more other providers include customer sales phone numbers.

4. The non-transitory computer readable medium of claim 2, wherein the webpage URLs of the one or more other providers include URLs of sales webpages.

5. The non-transitory computer readable medium of claim 1, wherein the input data indicates potential bill payments made by the customer to at least one other provider.

6. The non-transitory computer readable medium of claim 5, wherein the telephone numbers of the one or more other providers include payment related phone numbers.

7. The non-transitory computer readable medium of claim 5, wherein the webpage URLs of the one or more other providers include URLs of payment related webpages.

8. The non-transitory computer readable medium of claim 1, wherein processing the collected data to form the input data includes matching the telephone numbers of the one or more other providers to the CDRs stored for the customer by the CSP.

9. The non-transitory computer readable medium of claim 8, wherein processing the collected data to form the input data includes:
    accessing, in storage of the CSP, the CDRs associated with the customer,
    matching one or more of the CDRs to one or more of the telephone numbers of the one or more other providers, and
    storing, as the input data, each of the one or more CDRs as indicating a potential payment made by the customer.

10. The non-transitory computer readable medium of claim 1, wherein processing the collected data to form input data includes matching the webpage URLs of the one or more other providers to the Internet browsing events associated with the customer.

11. The non-transitory computer readable medium of claim 10, wherein processing the collected data to form the input data includes:

accessing, in storage of the CSP, the Internet browsing events associated with the customer and stored by the CSP, matching one or more of the Internet browsing events to one or more of the webpage URLs of the one or more other providers, and storing, as the input data, each of the one or more Internet browsing events as indicating a potential payment made by the customer.

12. The non-transitory computer readable medium of claim 1, wherein the data further includes billing information stored by the CSP for the customer.

13. The non-transitory computer readable medium of claim 12, wherein the billing information indicates purchases made by the customer in association with one or more other product or providers and billed to the customer by the CSP through direct carrier billing.

14. The non-transitory computer readable medium of claim 12, wherein the billing information indicates purchases made by the customer for products or services of the CSP.

15. The non-transitory computer readable medium of claim 1, wherein the at least one payment related prediction is a prediction of a time period when the customer will make a payment.

16. The non-transitory computer readable medium of claim 15, wherein the payment is a payment on a bill.

17. The non-transitory computer readable medium of claim 15, wherein the payment is a purchase of a new product or service.

18. The non-transitory computer readable medium of claim 1, wherein the at least one payment related prediction is output for:

determining a time to request from the customer payment on a bill, determining a time to offer a new product or service to the customer for purchase, or determining a time when the customer usually makes payments.

19. A method, comprising:

identifying, by a system of a communication service provider (CSP), a customer of the CSP;

collecting, by the system, data from a plurality of data sources independent from the CSP, wherein the data includes, at least in part, one of:

telephone numbers of one or more other providers that are associated with making payments, or webpage uniform resource locators (URLs) of one or more other providers that are associated with making payments;

processing, by the system, the collected data to form input data, the processing including matching at least one of:

the telephone numbers of the one or more other providers to call detail records (CDRs) stored for the customer by the CSP such that the input data indicates, at least in part, one or more of the telephone numbers of the one or more other providers that were previously called by the customer, or the webpage URLs of the one or more other providers to Internet browsing events associated with the customer and stored by the CSP such that the input data indicates, at least in part, one or more of the webpage URLs of the one or more other providers that were previously accessed by the customer;

processing, by the system, the input data using at least one machine learning algorithm, to make at least one payment related prediction for the customer that is based on the one or more other providers having a payment related phone number previously called by the customer or the one or more other providers having a payment related webpage previously accessed by the customer; and outputting, by the system, the at least one payment related prediction made for the customer.

20. A communication service provider (CSP) system, comprising:

a non-transitory memory storing instructions; and one or more processors in communication with the non-transitory memory that execute the instructions to perform a method comprising:

identifying a customer of the CSP;

collecting data from a plurality of data sources independent from the CSP, wherein the data includes, at least in part, one of:

telephone numbers of one or more other providers that are associated with making payments, or webpage uniform resource locators (URLs) of one or more other providers that are associated with making payments;

processing the collected data to form input data, the processing including matching at least one of:

the telephone numbers of the one or more other providers to call detail records (CDRs) stored for the customer by the CSP such that the input data indicates, at least in part, one or more of the telephone numbers of the one or more other providers that were previously called by the customer, or the webpage URLs of the one or more other providers to Internet browsing events associated with the customer and stored by the CSP such that the input data indicates, at least in part, one or more of the webpage URLs of the one or more other providers that were previously accessed by the customer;

processing the input data using at least one machine learning algorithm, to make at least one payment related prediction for the customer that is based on the one or more other providers having a payment related phone number previously called by the customer or the one or more other providers having a payment related webpage previously accessed by the customer; and outputting the at least one payment related prediction made for the customer.

* * * * *